United States Patent [19]
Chaney

[11] Patent Number: 5,056,921
[45] Date of Patent: Oct. 15, 1991

[54] OPTICAL APPARATUS FOR USE WITH INTEFEROMETRIC MEASURING DEVICES

[75] Inventor: Raymond J. Chaney, Berkeley, United Kingdom

[73] Assignee: Renishaw plc, Gloucesterhire, United Kingdom

[21] Appl. No.: 382,658
[22] PCT Filed: Dec. 20, 1988
[86] PCT No.: PCT/GB88/01137
§ 371 Date: Aug. 4, 1989
§ 102(e) Date: Aug. 4, 1989
[87] PCT Pub. No.: WO89/05955
PCT Pub. Date: Jun. 29, 1989

[30] Foreign Application Priority Data
Dec. 24, 1987 [GB] United Kingdom ............ 8730169

[51] Int. Cl.$^5$ ............................................. G01B 9/02
[52] U.S. Cl. .................................... 356/351; 356/358
[58] Field of Search ................... 356/351, 358, 363

[56] References Cited
U.S. PATENT DOCUMENTS

| | | |
|---|---|---|
| 3,622,244 | 11/1971 | Chitayat . |
| 3,654,446 | 4/1972 | Gordon et al. . |
| 3,692,413 | 9/1972 | Marcy et al. ............ 356/363 X |
| 3,790,028 | 2/1974 | Baldwin . |
| 3,790,284 | 2/1974 | Baldwin ............ 356/351 X |
| 4,261,107 | 4/1981 | Coleman et al. . |
| 4,365,301 | 12/1982 | Arnold et al. ............ 356/358 X |
| 4,498,773 | 2/1985 | von Bieren . |
| 4,836,678 | 6/1989 | Okaji ............ 356/363 X |

FOREIGN PATENT DOCUMENTS

| | | |
|---|---|---|
| 1945487 | 4/1971 | Fed. Rep. of Germany . |
| 2088675 | 1/1972 | France . |
| 2183908 | 12/1973 | France . |
| 2121165 | 12/1983 | United Kingdom . |
| 2162942 | 2/1986 | United Kingdom . |

OTHER PUBLICATIONS

Feinwerktechn. & Messtechn. vol. 85, No. 6, 8/9/77.

Primary Examiner—Davis L. Willis
Assistant Examiner—Matthew W. Koren
Attorney, Agent, or Firm—Oliff & Berridge

[57] ABSTRACT

A laser inteferometer system is disclosed which is able to make measurements of any deviations in the movement of a machine component which is moving along a main movement axis. The system can measure roll, pitch, yaw, straightness, and parallelism of two tracks using a single laser beam. FIG. 1 shows an arrangement for measuring roll of a vertical machine column (2) during movement of the column along the x-axis of a machine. A straight mirror (6) is positioned on the machine bed with its longitudinal axis aligned with the x-axis, and its reflecting surface normal to the x-axis. An optical component including a polarizing beam splitter is mounted for movement with the machine column and generates from a laser beam (A), a measuring beam (B1) and a reference beam (B2) both directed at the mirror, but laterally separated in the direction of the Z axis. The reflected beams from the mirror are re-combined in the optical device to form a return beam (C) directed towards a detector adjacent the laser (9). Any change in relative length of the beams (B1) and (B2) give a meausre of roll. Yaw can be measured by producing beams (B1) and (B2) laterally separated in the direction of movement, i.e. along the x-axis. Straightness is measure using a fixed length reference arm within the optical device. Parallelism is meausured by taking straightness measurements of both pillars (2) and (2a). Pitch can be measured by producing four beams.

24 Claims, 5 Drawing Sheets

OPTICAL APPARATUS FOR USE WITH INTEFEROMETRIC MEASURING DEVICES

The present invention relates to optical apparatus for use with interferometric measuring devices. In particular, the invention relates to optical apparatus for measuring deviations in the movement of a machine component during movement thereof along its main movement axis with an interferometric measuring device.

Deviations in the movement of a machine component along its main movement axis generally involve rotation of the component about one or more axes of the machine, usually referred to as the x, y and z axes, and are referred to as pitch, roll and yaw errors. There are also errors in straightness of the movement which involve lateral deviations of the machine component from the main movement axis.

For the purposes of this specification, assuming that the machine component is moving along the x axis as its main movement axis, "roll" is defined as rotation of the component about an axis parallel to the x axis, "pitch" is defined as rotation of the component about an axis parallel to the y axis, and "yaw" is defined as rotation of the component about an axis parallel to the z axis.

Throughout this specification the reference to a light beam should be interpreted to mean a beam having a wavelength in the range from infra-red, through visible to the ultra violet part of the spectrum.

In accordance with the present invention optical apparatus for measuring deviations in the movement of a machine component during movement thereof along its main movement axis comprises, an optical device and a straight mirror, one of which is attached to the machine component, the other of which is mounted on a fixed part of the machine whereby relative movement is established therebetween during movement of the machine component, said mirror having a longitudinal axis which is arranged to be parallel to the main movement axis of the machine component so that its reflecting surface faces in a direction normal to the main movement axis of the machine component, means for generating at least one light beam directed towards the optical device, and wherein the optical device includes means for generating from said at least one light beam, a measuring beam directed orthogonally towards the reflecting surface of the mirror on a first path, and a reference beam, means being provided for interferometrically determining any variation in the path length of the measuring beam in relation to that of the reference beam.

The invention also includes methods of measuring roll, straightness, parallelism, pitch and yaw of the machine component as defined in the appended claims.

Examples of the invention will now be more particularly described with reference to the accompanying drawings in which.

Figure 1:
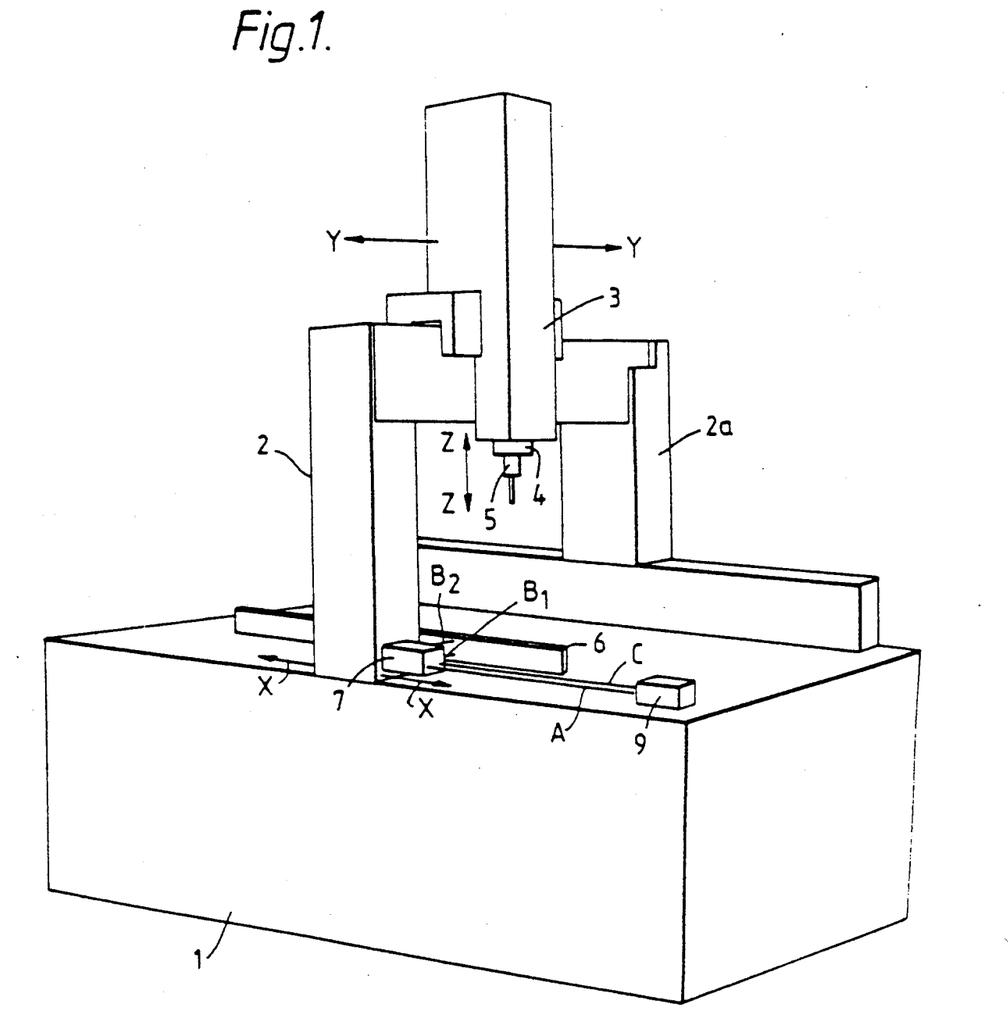
FIG. 1 illustrates schematically the principle used by the invention for measuring roll of a machine component in one direction of movement thereof.

Referring now to FIG. 1 of the drawings there is shown a measuring machine having a fixed work-table 1, and movable components including a vertical columns 2, 2a having a main axis of movement in the direction x—x, a carriage 3 mounted on the column 2 and having a main axis of movement in the direction y—y, and a spindle 4 supported on the carriage 3 and having a main axis of movement in the direction z—z. The spindle 4 supports a measuring probe 5 for determining the position of a workpiece (not shown) which is placed on the worktable 1.

During measurements of a workpiece the movements of the various machine components are subject to errors in that the movable machine components can suffer deviations such as rolling, pitching and yawing movements about their main axes of movement.

Although various methods have been described for measuring such deviations, for example in U.S. Pat. Nos. 3,654,446, 3,790,284, 4,261,107, measurement of errors due to the rolling movements of the machine component are the most difficult to obtain accurately by interferometric methods and the systems employed for such measurements are relatively expensive.

The apparatus employed by the present invention enables inter alia, direct measurements of rolling movements to be obtained with high accuracy and with little complexity using a single interferometer. This is achieved by using an optically straight mirror 6 mounted on a fixed part of the machine, e.g. the worktable, mounting an optical device 7 on the movable machine component being measured, directing two light beams $B_1$ and $B_2$ at the mirror 6 from the optical device 7, and receiving the return beams reflected from the mirror in the optical device, whereby any difference in the path length of the two beams due to rolling motion of the machine component can be determined interferometrically. One of the beams, say B1, can be regarded as a measuring beam, while the other, B2 is the reference beam.

As can be seen from FIG. 1, roll of the vertical column 2 about its main axis of movement x—x will cause rotation of the optical device 7, thereby respectively increasing the path length of one of the light beams and decreasing the path length of the other. The light beams $B_1$ and $B_2$ are derived from a laser 9 mounted statically on, or adjacent to, the machine worktable, and which directs a single beam A towards the optical device 7. A return beam C from the optical device 7 is received by a detector (not shown) adjacent the laser.

Figure 2:
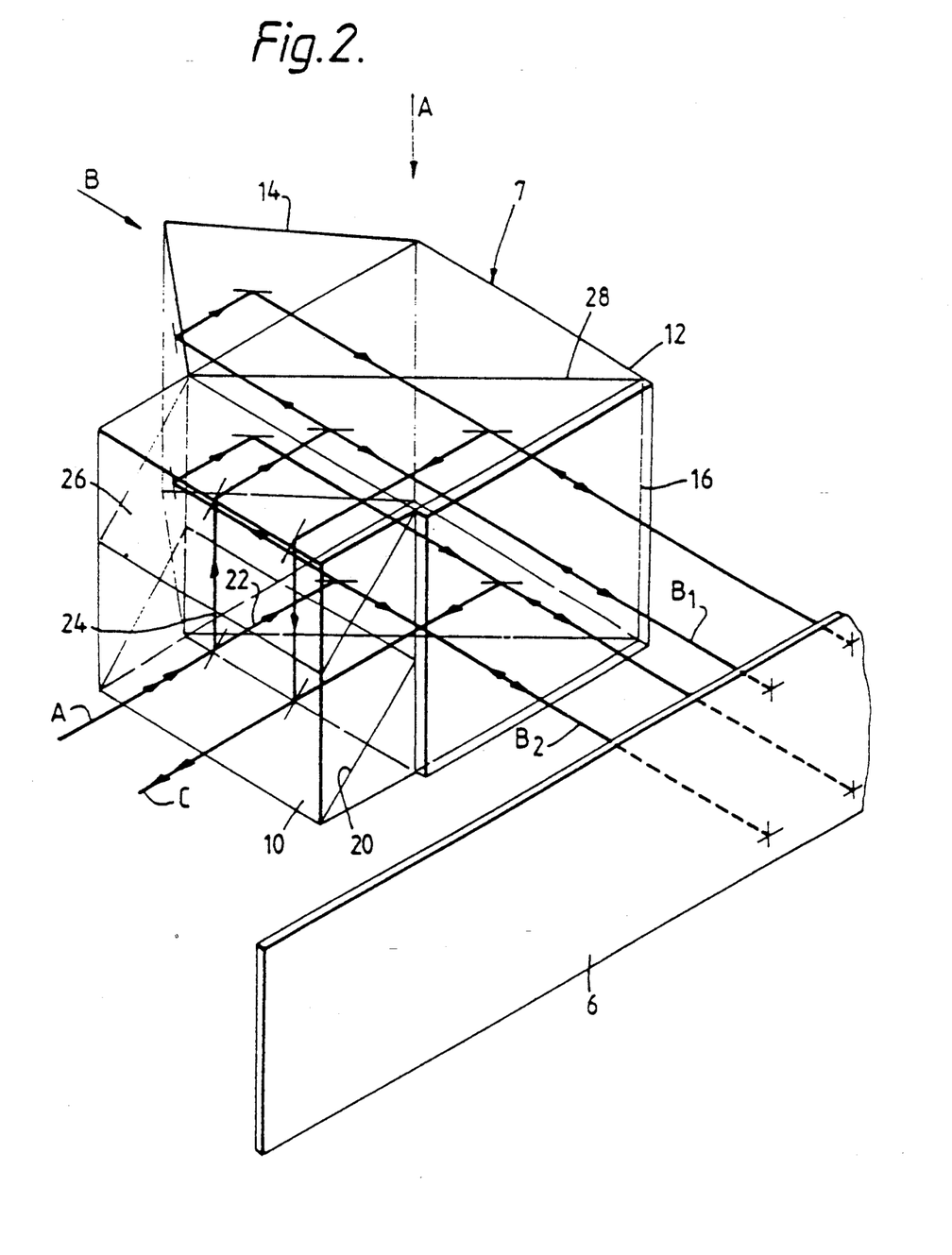
FIG. 2 is an illustration of one embodiment of an optical device for use on the machine shown in FIG. 1 showing the paths of the various light beams through the device.
Figure 3:
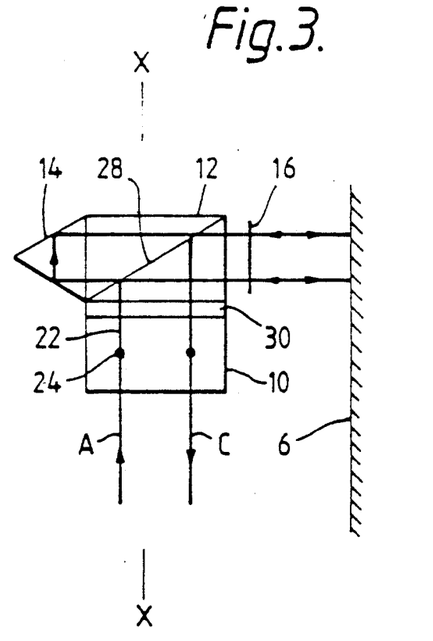
FIG. 3 is a plan view in the direction of the arrow A of FIG. 2.
Figure 4:
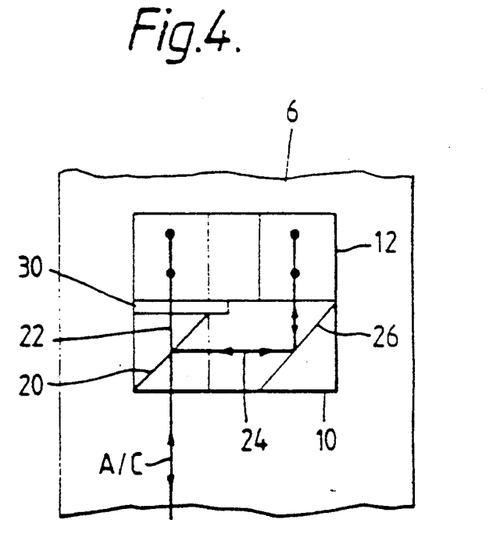
FIG. 4 is an end view in the direction of the arrow B of FIG. 2.

Referring now to FIGS. 2 to 4 of the drawings the optical device 7 comprises in combination, a polarising beam splitter and periscope unit 10, a polarising cube beam splitter unit 12, a retro-reflector unit 14 and a quarter wave plate 16.

The laser beam A is directed towards the unit 10 where at a first beam splitting surface 20 a first portion 22 of the beam is transmitted to the unit 12, and a second portion 24 is reflected at right angles towards an inclined reflecting surface 26. At the surface 26 beam portion 24 is reflected into unit 12 in a direction parallel to beam portion 22.

Since the beam splitting surface 20 polarises the beam A into two orthogonal polarisation states, the transmitted beam portion 22 is next passed through a half-wave plate 30 (FIG. 4) to change its polarisation state to that of the reflected beam portion 24.

Beam portion 22 next passes to a second polarising beam splitting surface 28 in unit 12 where it is reflected towards the mirror 6 and through the quarter wave plate 16. At mirror 6 the beam portion 22 is reflected back and passes again through the quarter wave plate 16. Having passed twice through the quarter wave plate 16 the polarisation state of beam portion 22 is such that on arrival at the beam splitting surface 28 it is transmitted to the retro-reflector 14. Retro-reflector 14 returns the beam portion 22 to the mirror 6 on a parallel track through the beam splitting surface 28 and the quarter wave plate 16, and the mirror 6 reflects it back through the quarter wave plate 16 to the beam splitting surface 28. After its two further passages through the quarter wave plate 16 the beam portion 22 is reflected at the beam splitting surface 28 and is directed back towards the unit 10.

In order to avoid further reflection at the beam splitting surface 20 the beam portion 22 is passed once again through the half wave plate 30 to change its polarisation state so that it will be transmitted through the beam splitting surface 20 and will leave the optical device 7 as outgoing beam C on a path parallel to, but displaced from, the incoming laser beam A.

The reflected beam portion 24 on leaving the reflecting surface 26 follows a similar path to that of the transmitted beam portion 22 except that it does not pass through the half wave plate 30. Thus the paths of the beam portions 22 and 24 exactly parallel each other through unit 12 to the mirror 6, the arrangement being such that after leaving unit 12, the beam portion 24 is deflected by the two beam splitting surfaces 26, 20 of the periscope to be combined with beam portion 22 so that the beam C leaving the optical device 7 is a composite beam.

It can be seen therefore that if the total path lengths of the two beam portions 22 and 24 between the beam splitting surface 28 and the mirror change, due to roll of the optical device about the axis x—x, the beam portions 22 and 24 of the composite beam B will be phase shifted and be capable of producing interference fringes which can be detected. Beam portions 22 and 24 respectively form the beams B1 and B2 of the measuring and reference arms of the interferometer referred to above. Thus the composite beam C is directed into an appropriate fringe detection system (many types of which are available), which gives an ouput in dependence upon the fringe count as the machine moves. Since the fringe count is directly related to the amount of roll of the moving machine component, the machine readings can be corrected either in real time or stored and corrected later.

The optical device described above may be modified in a simple manner to enable yawing movements of the pillar to be measured. All that is required is to mount the combined beam splitter and periscope device 10 and the roof top reflector 14 in a position at right angles to that shown, so that the beams B1 and B2 instead of being vertically displaced, as shown in FIG. 1 to 4 become horizontally displaced. Then it can be seen that rotation of the optical device about the z axis will cause a variation in path length of beam B1 compared to beam B2, and this can be detected by creating interference fringes from the combined return beam in known manner.

The above described embodiment, although using several relatively expensive optical components, will provide high accuracy in its readings. Pitching and yawing motions of the vertical column will not affect the path length of the two beam portions being measured, although some deflection of the beams will take place. Provided that these deflections are small they can be accommodated by the optical device. Similarly any unforseen deviations in the movement of the vertical columns in the x, y and z directions will not affect the path length differential of the beams.

Although the retro-reflector illustrated in the optical device of FIGS. 1 to 4 is a roof top prism, it will be understood that it could be replaced by a pair of corner cube reflectors at a known distance apart. This will further reduce or eliminate any errors in the roll or yaw movements if the beam A impinges on the optical device in a direction which is not parallel to the direction of the axis of motion x—x.

Figure 5:
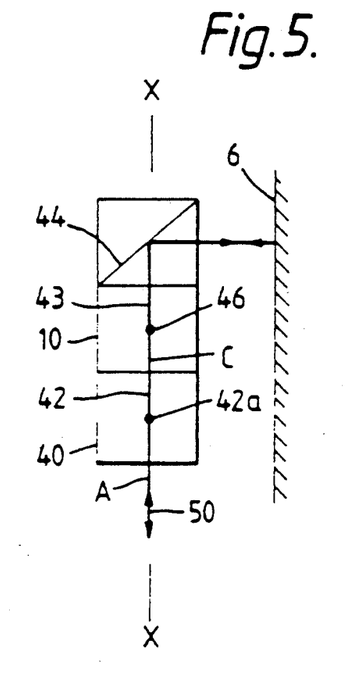
FIG. 5 is a plan view of an alternative optical component for use with the machine of FIG. 1.
Figure 6:
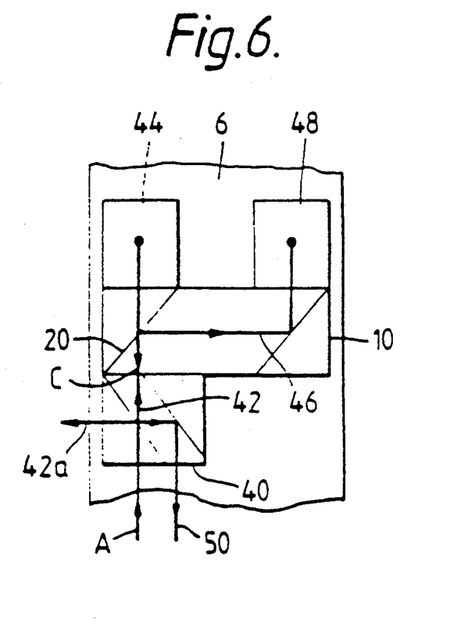
FIG. 6 is an elevation of the optical component of FIG. 5.

A less expensive optical device which also performs in accordance with the invention is shown in FIGS. 5 and 6. In this embodiment the polarising beam splitter unit 12 and the retro-reflector unit 14 of the embodiment of FIGS. 2 to 4 are replaced by a single plane mirror. This also allows for the quarter-wave plate 16 to be eliminated. The result is that the returning composite beam C is co-incident with the incoming laser beam A and may interfere with the operation of the laser. Lateral displacement of the incoming and return beams in achieved with a second beam splitting and periscope unit, in order to separate the return beam for use in the detectors.

Referring now to FIGS. 5 and 6 components of the alternative device which are identical to those of FIG. 1 are given the same reference numerals.

The incoming laser beam A passes through a non-polarising beam splitter and periscope unit 40 and the transmitted beam portion 42 passes to the polarising beam splitter and periscope unit 10. The reflected beam portion 42a passes out of the apparatus and is lost.

As in the embodiments described in FIGS. 2 to 4, the transmitted beam portion 42 is split at the surface 20, a further transmitted beam portion 43 passing to the plane mirror 44 by means of which it is deflected towards the mirror 6 which in turn reflects it back along its path to the surface 20.

The reflected beam portion 46 is deflected by the periscope along a parallel path to a second plane mirror 48 (or to a second portion 48 of the same plane mirror 44) and is deflected to mirror 6 and back again through the periscope to surface 20 where it re-combines with the transmitted portion 43 of the beam to form combined beam C.

The combined beam C travels back towards the laser and is split by the beam splitter and periscope unit 40 to provide a deflected beam portion 50 which is directed into a detector system to generate and count any interference fringes caused by rolling movements of the optical device in the same manner as described above with respect to the embodiment shown in FIGS. 2 to 4. The beam portions 42 and 46 in this embodiment therefore form the beams $B_1$ and $B_2$ of the measuring and reference arms of the interferometer.

Clearly other modifications may be made to the above described optical components while achieving the same result. For example, the retro-reflector 14 is shown as a roof-top prism but it may be replaced by a pair of corner cube reflectors in known manner. Also the unit 40 need not be part of the optical device but may be positioned within or close to the laser.

Figure 7:
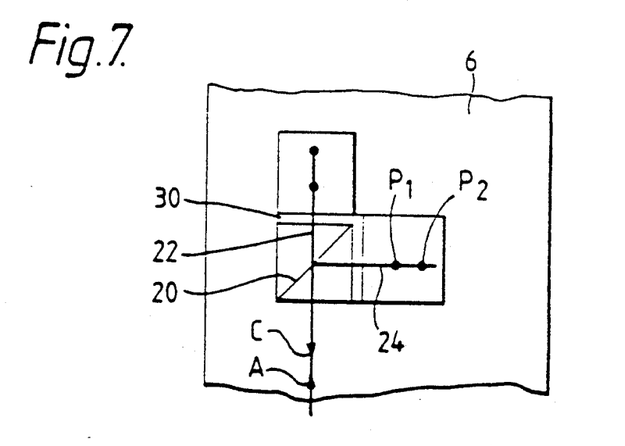
FIG. 7 shows a modification to the optical device of FIG. 4.

Another modification of the embodiment shown in FIG. 4 is shown in FIG. 7. In this modification the second reflecting surface 26 of the periscope is deleted and replaced by a polarising beam splitting surface equivalent to surface 28 and arranged to reflect the beam towards the mirror 6 at points P1 and, after reflection from retro reflector 14, at P2 as shown. Such an arrangement would however be sensitive to any inaccuracies along the length of the mirror since the two beams $B_1$ and $B_2$ will now impinge on the mirror at two different points along its length. The advantage of this arrangement however is that the reference and measuring beams pass through the same amount of glass and the arrangement is more symmetrical.

Figure 8:
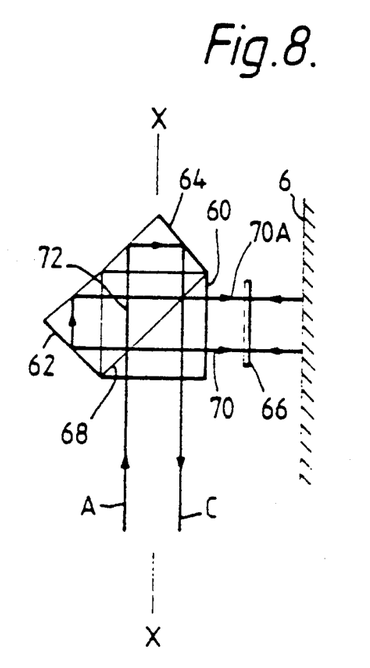
FIG. 8 is a plan view of an alternative optical device for measuring straightness of the movement of a machine component.

Referring now to FIG. 8 there is shown another modified version of the optical device of FIGS. 2 to 4 capable of measuring the straightness of the movement of the vertical machine column 2 along the direction x—x.

The optical device is made up of a polarising beam-splitting cube 60 and two retro-reflectors 62 and 64 on adjacent sides of the cube 60. A quarter wave plate 66 is placed between the cube 60 and the straight mirror 6 on the opposite of the cube from the reflector 62.

In this arrangement an incoming laser beam A is split at a beam splitting surface 68 of the cube, the reflected part of the beam 70 being directed towards the mirror 6, and after passing through the quarter wave plate 66 is reflected from the mirror 6 and passes once again through the quarter wave plate 66 to the beam splitting surface 68. Having passed twice through the quarter wave plate 66 the polarisation state of the beam is such that it is now transmitted at the beam splitting surface 68 and is reflected back via the retro-reflector 62 to the mirror 6 as beam 70A passing through the beam splitting surface 68 and the quarter wave plate on the way. After being reflected from the mirror the beam 70A passes a second time through the quarter wave plate 66 so that its polarisation state is now such that it is reflected at the beam splitting surface 68 and leaves the optical device as part of the outgoing beam C.

The beams 70, 70A form the beam B1 of the measuring arm of an interferometer and, since the mirror is straight any lateral movement of the device while moving in the direction x—x will cause a change in the path length of the beams 70, 70A.

The portion 72 of the incoming beam A which is transmitted through the beam splitting surface 68 is reflected around the retro-reflector 64. This portion 72 of beam A forms the beam B2 of the reference arm of the interferometer, and is combined with the measuring beam B1 at the beam splitting surface 68 to form a composite outgoing beam C.

If there is any straightness error in the movement of the optical device, the total length of the beams 70 and 70A will change and there will be interference of the measuring beam and reference beam parts of the composite beam C which can be detected in the detector and measured.

Figure 9:
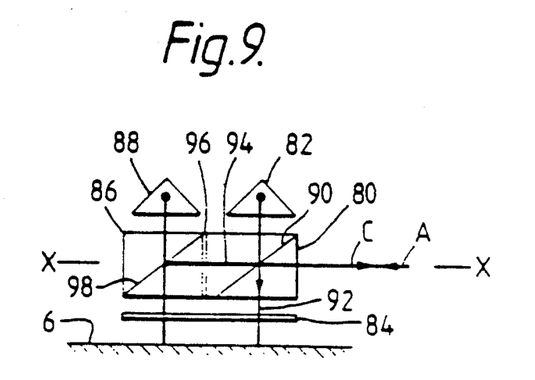
FIG. 9 is a plan view of a further alternative optical device for measuring yawing movements of a machine component.

Referring now to FIG. 9 there is shown a beam path diagram for an optical device which will measure yawing movements of the vertical machine column 2 as it moves along the direction x—x using the same laser and mirror positions as shown in FIG. 1. This optical component includes a polarising beam splitter 80 together with a retro-reflector 82, a quarter wave plate 84, a polarising beam splitter 86 and retro-reflector 88.

As described with reference to the earlier embodiment an incoming laser beam A is split at a polarising beam splitting surface 90 of the beam splitter 80 into reflected and transmitted components 92 and 94 respectively. The reflected component 92 travels through the quarter wave plate 84 to the mirror 6 and back to the beam splitting surface where its polarisation state enables it to be transmitted to the retro-reflector which returns it on a laterally spaced parallel path back to the mirror and to the beam splitter. Due to its two further passages through the quarter wave plate 84 it is finally reflected at the beam splitting surface 90 and leaves the device as a returning beam C.

The transmitted component 94 however, passes through a half wave plate 96 to a second polarising beam splitting surface 98 where, in parallel with the reflected component 92 it is reflected through the quarter wave plate 84 to the mirror, back to the retro-reflector where it is laterally displaced, back to the mirror 6 and back along its incoming path to be re-combined at the beam splitting surface 90 with the reflected component 92 to form a composite returning beam C.

It can be seen that yawing movements of the vertical machine column which rotate the optical device about the axis z—z will cause the path of one of the reflected or transmitted components 92, 94 of beam A to increase while the other one decreases. This differential change in the two path lengths will give rise to interference in the composite return beam C which can be detected and the deviation measured.

By suitable relative positioning and orientation of the optical devices and the straight mirror 6 described above, pitching movements of the vertical column can be measured and, the pitching, rolling, yawing and straightness deviations of the carriage 3 when moving along its axis z—z, and of the cross member 4 when moving along its axis y—y can also be measured interferometrically.

The apparatus of the present invention can also be used to measure parallelism of two slideways of a machine, for example the slideways on which the vertical columns 2, 2a of FIG. 1 move in the direction x—x.

To measure parallelism the mirror 6 may be placed in a fixed position parallel to the slideways. The optical device is mounted first on one of the vertical columns to measure straightness of the movement of the column by any of the methods described above. Then the optical device is transferred to the other vertical column and the process repeated to determine the straightness of the second slideway. By comparing the readings from both operations it is possible to determine the parallelism i.e. the relative straightness between the two slideways.

Figure 10:
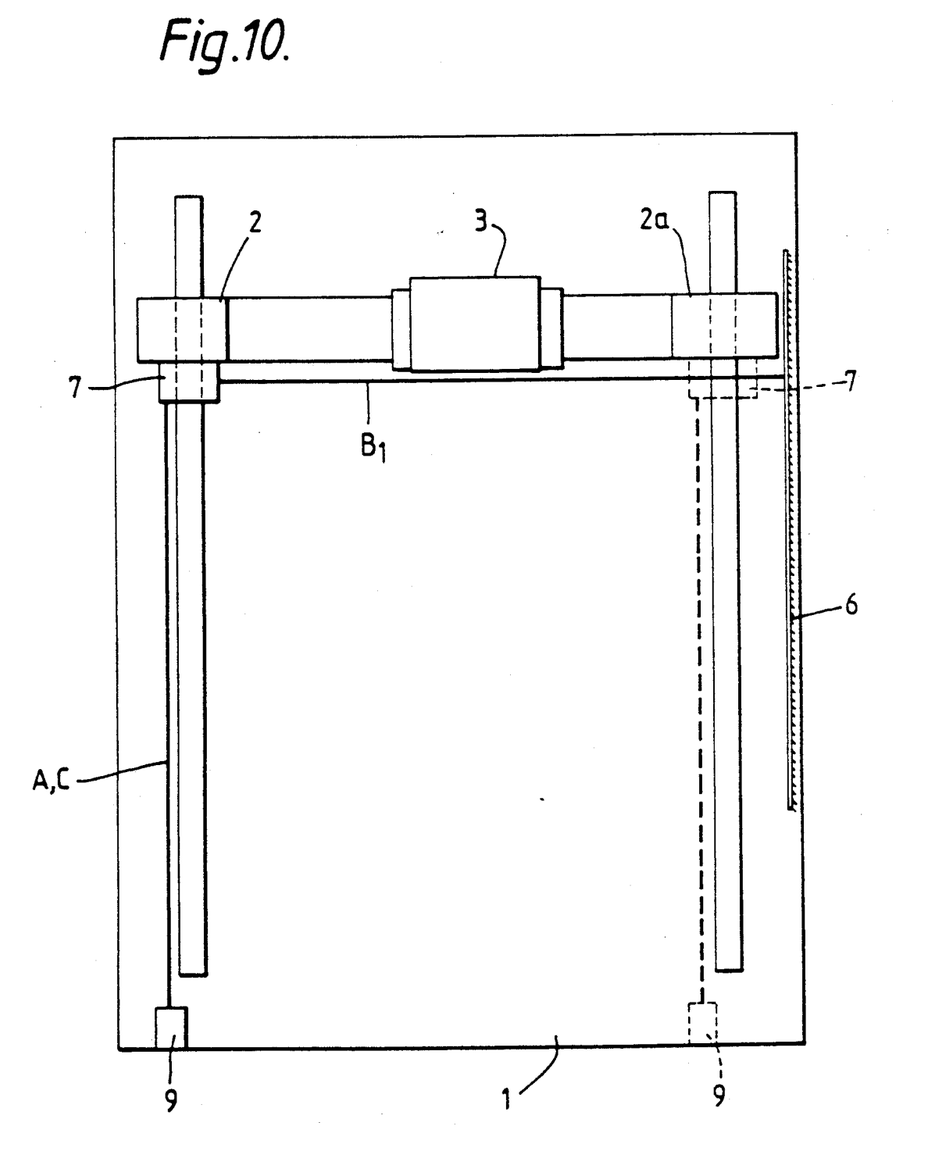
FIG. 10 is a plan view of the machine showing the positioning of the mirror and optical device for measuring parallelism of two tracks of the machine.

This is diagrammatrically illustrated in FIG. 10, which shows the mirror 6 positioned on the fixed machine structure and the optical device carried by column 2 as shown in FIG. 1 for making the measurement of the straightness of the movement of the column 2 along its main movement axis x—x. The position of the laser 9 and detector are as described with reference to FIG. 1 and the optical device 7 is as described with reference to FIG. 8.

The straightness of the movement of column 2a along its track is measured by setting up the laser 9 and optical device 7 as shown in dotted lines. From the measurements taken the mean straightness of the movement of each column can be determined and thus the degree to which the two tracks are non-parallel can also be determined.

Thus by measuring the various deviation of the movements of the different machine components from their anticipated lines, the errors in the readings of the machine scales can be determined and the errors in the position of the probe as read from the scales of the machine due to the above described deviations in movement can be corrected.

In a further modification of the invention, the quarter wave plates disclosed may be dispensed with if the retro-reflectors are chosen with appropriate refractive indices to achieve total internal reflection of the light beams which will alter their polarisation states in known manner.

I claim:

1. Optical apparatus for measuring deviations in the movement of a machine component during movement thereof along its main movement axis comprises:

an optical device and a straight mirror, one of which is attached to the machine component, the other of which is mounted on a fixed part of the machine whereby relative movement is established therebetween during movement of the machine component, said mirror having a longitudinal axis which is arranged to be parallel to the main movement axis of the machine component so that its reflecting surface faces in a direction normal to the main movement axis of the machine component, means for generating at least one light beam directed towards the optical device, and wherein the optical device includes means for generating from said at least one light beam, a measuring beam directed orthogonally towards the reflecting surface of the mirror on a first path, and a reference beam, means being provided for interferometrically determining any variation in the path length of the measuring beam in relation to that of the reference beam, and means being provided for directing the reference beam at the mirror along a first path parallel to the first path of the measuring beam but laterally displaced therefrom.

2. Optical apparatus according to claim 1 and in which the reference beam is a fixed length reference beam.

3. Optical apparatus according to claim 2 and in which the means for generating the measuring and reference beams comprises:

a polarising beam splitter for producing a reflected beam directed towards the straight mirror which constitutes the measuring beam, and a transmitted beam, which constitutes the reference beam, a first retro-reflector in the path of the transmitted beam for returning the transmitted beam to the polarising beam splitter along a path laterally separated from its incoming path, and a second retro-reflector for receiving the reflected beam from the straight mirror and for returning it along a path laterally separated from its incoming path.

4. Optical apparatus according to claim 3 and in which a quarter wave plate is provided in the path of the measuring beam between the polarising beam splitter and the straight mirror.

5. Optical apparatus according to claim 1 and in which the reference beam is laterally displaced from the measuring beam in the direction of the main movement axis.

6. Optical apparatus according to claim 5 and in which the means for directing the reference beam at the mirror along a first path parallel to the first path of the measuring beam comprises:

a first polarising beam splitter for producing a reflected beam constituting the measuring beam, and a transmitted beam orthogonal thereto constituting the reference beam, a second beam splitting surface for producing from the transmitted beam a reflected beam directed towards the mirror.

7. Optical apparatus according to claim 6 and in which a retro-reflector is provided in the paths of each of the measuring and reference beams after reflection from the mirror to produce lateral separation between the incoming laser beam and the outgoing combined beam.

8. Optical apparatus according to claim 7 and in which:

i) the transmitted beam from the first polarising beam splitter passes in sequence to a half-wave plate, a second polarising beam splitter, a quarter-wave plate, the straight mirror, said quarter-wave plate, the second polarising beam splitter, the retro-reflector, the second polarising beam splitter, said quarter-wave plate, the straight mirror, the second polarising beam splitter, the half-wave plate, and the first polarising beam splitter, ii) the reflected beam from the first polarising beam splitter passes in sequence to a quarter-wave plate, the straight mirror, the quarter-wave plate, the first polarising beam splitter, the retro-reflector, the first polarising beam splitter, the quarter-wave plate, the straight mirror, the quarter-wave plate and the first polarising beam splitter, and in which, iii) the reflected beam and the transmitted beam are re-combined at the first polarising beam splitter to form a return beam for receipt by a detector.

9. Optical apparatus according to claim 1 and in which the reference beam is laterally displaced from the measuring beam in a direction perpendicular to the direction of the main movement axis.

10. Optical apparatus according to claim 1 and in which the means for directing the reference beam at the mirror along a first path parallel to the first path of the measuring beam comprises:

a first polarising beam splitter for producing a reflected beam constituting the measuring beam, and a transmitted beam orthogonal thereto, constituting the reference beam, a periscope for deflecting one of said beams onto a path parallel to but laterally displaced the other, and, an inclined reflecting surface in the path of each of the beams to deflect them towards the mirror.

11. Optical apparatus according to claim 10 and in which the inclined reflecting surface comprises a second polarising beam splitting surface.

12. Optical apparatus according to claim 11 and in which retro-reflecting means are provided for producing, in each of the measuring and reference beams, two parallel beam portions laterally separated from each other.

13. Optical apparatus according to claim 12 and in which wave plates are provided in the beam paths of the measuring and reference beams in order to change their polaristion states to allow transmission through, and reflection from the second beam splitting device.

14. Optical apparatus according to claim 13 and in which:
   i) the transmitted beam from the first polarising beam splitter passes in sequence to a half-wave plate, the second polarising beam splitting surface, a quarter-wave plate, the mirror, said quarter-wave plate, the second polarising beam splitting surface, the retro-reflecting means, the second polarising beam splitting surface, said quarter wave-plate, the mirror, said quarter-wave plate, the second beam splitting surface, the half-wave plate and the first beam splitting surface,
   ii) the reflected beam from the first polarising beam splitter passes in sequence to the periscope, the second polarising beam splitting surface, said quarter-wave plate, the mirror, said quarter-wave plate, the second beam splitting surface, the retro-reflecting means, the second polarising beam splitting surface, said quarter-wave plate, the mirror, said quarter-wave plate, the second beam splitting surface and the periscope, and in which:
   iii) the reflected beam and the transmitted beam are recombined at the first beam splitting surface to form a return beam for receipt by a detector.

15. Optical apparatus according to claim 10 and in which the inclined reflecting surface is a plane mirror.

16. Optical apparatus according to claim 15 and in which a second beam-splitter and periscope unit is provided in the path of the combined return beam to provide lateral separation from the incoming laser beam.

17. Optical apparatus according to claim 16 and in which:
   i) the transmitted beam from the first polarising beam splitter passes in sequence to a half-wave plate, a plane mirror, the straight mirror, said plane mirror the half-wave plate, and the first polarising beam splitter,
   ii) the reflected beam from the first polarising beam splitter passes in sequence to the periscope, a plane mirror, the straight mirror, said plane mirror, the periscope and, the first beam splitting surface, and in which:
   iii) the reflected beam and transmitted beam are recombined at the first beam splitting surface to form a return beam which is deflected by the second beam splitter and periscope units towards a detector.

18. A method of measuring deviations in the movement of a movable machine component during movement thereof relative to a fixed machine structure along a main movement axis comprising the steps of:

mounting a straight mirror on one of the movable machine component and the fixed machine structure with it's longitudinal axis parallel to, and it's reflecting surface orthogonal to said main movement axis, mounting an optical component on the other one of the movable machine component and the fixed machine structure whereby relative movement occurs between the optical component and the mirror when the machine component moves along the main movement axis, directing a light beam to be incident on the optical component, producing from the optical component a measuring beam and a reference beam, at least the measuring beam being directed towards the reflecting surface of the mirror at right angles thereto, the reference beam also being reflected by a reflector, receiving the reflected measuring beam from the mirror and the reflected reference beam and combining them into a single return beam, producing in one of the beams a polarisation state different to that of the other one of the beams before combining them into a single return beam, directing the single combined beam into a detector for determining interferometrically any relative change in path lengths between the two beams, and, providing a signal indicative of said relative change in path length.

19. A method according to claim 18 for measuring rolling movements of the machine component as it moves along the main movement axis and wherein the reference beam is also directed towards the mirror along a path parallel to the path of the measuring beam but separated therefrom laterally in a direction perpendicular to the main movement axis.

20. A method according to claim 18 for measuring yawing movements of the machine component as it moves along the main movement axis and wherein the reference beam is also directed towards the mirror along a path parallel to the path of the measuring beam but separated therefrom laterally in the direction of the main movement axis.

21. A method according to claim 19 for measuring the straightness of the movement of the machine component along the main movement axis and wherein the reference beam is directed over a fixed distance to a retro-reflector.

22. A method according to claim 21 for measuring the parallelism of two tracks on which machine components move comprises the further steps of:

measuring the straightness of a first track with one of the mirror and the optical device mounted on a machine component movable therealong, re-positioning said one of the mirror and the optical device onto a second machine component movable along the second track, measuring the straightness of the second track, and determining from the two straightness measurements the parallelism of the two tracks.

23. Optical apparatus for measuring deviations in the movement of a machine component during movement thereof along its main movement axis comprises:

an optical device and a straight mirror, one of which is attached to the machine component, the other of which is mounted on a fixed part of the machine whereby relative movement is established therebetween during movement of the machine component, said mirror having a longitudinal axis which is arranged to be parallel to the main movement axis of the machine component so that its reflecting surface faces in a direction normal to the main movement axis of the machine component, means for generating at least one light beam directed towards the optical device, and wherein the optical device includes means for generating from said at least one light beam, a measuring beam directed orthogonally towards the reflecting surface of the mirror on a first path, and a reference beam, wherein the reference beam is a fixed length reference beam, and means being provided for interferometrically determining any variation in the path length of the measuring beam in relation to that of the fixed length reference beam, and wherein the means for generating the measuring and reference beams comprises:

a polarising beam splitter for producing a reflected beam directed towards the straight mirror which constitutes the measuring beam, and a transmitted beam, which constitutes the reference beam, a first retro-reflector in the path of the transmitted beam for returning the transmitted beam to the polarising beam splitter along a path laterally separated from its incoming path, and a second retro-reflector for receiving the reflected beam from the straight mirror and for returning it along a path laterally separated from its incoming path.

24. Optical apparatus according to claim 23 and in which a quarter wave plate is provided in the path of the measuring beam between the polarizing beam splitter and the straight mirror.

* * * * *